US009390591B2

(12) United States Patent
Granich et al.

(10) Patent No.: US 9,390,591 B2
(45) Date of Patent: Jul. 12, 2016

(54) ONLINE LOTTERY SCRATCHER SYSTEM

(71) Applicants: William Granich, Woodland Hills, CA (US); Edmond A. Defrank, Northridge, CA (US); Nicolas Defrank, Northridge, CA (US); Antonio Defrank, Northridge, CA (US); Allen Mark Jones, Imperial Beach, CA (US)

(72) Inventors: William Granich, Woodland Hills, CA (US); Edmond A. Defrank, Northridge, CA (US); Nicolas Defrank, Northridge, CA (US); Antonio Defrank, Northridge, CA (US); Allen Mark Jones, Imperial Beach, CA (US)

( * ) Notice: Subject to any disclaimer, the term of this patent is extended or adjusted under 35 U.S.C. 154(b) by 125 days.

(21) Appl. No.: 14/207,644

(22) Filed: Mar. 13, 2014

(65) Prior Publication Data

US 2014/0315614 A1 Oct. 23, 2014

Related U.S. Application Data

(60) Provisional application No. 61/778,934, filed on Mar. 13, 2013.

(51) Int. Cl.
*A63F 13/00* (2014.01)
*G07F 17/32* (2006.01)

(52) U.S. Cl.
CPC .......... *G07F 17/329* (2013.01); *G07F 17/3209* (2013.01)

(58) Field of Classification Search
None
See application file for complete search history.

(56) References Cited

U.S. PATENT DOCUMENTS

| | | | | |
|---|---|---|---|---|
| 6,224,055 | B1 * | 5/2001 | Walker | A63F 3/0665 273/139 |
| 6,237,913 | B1 * | 5/2001 | Kamille | A63F 3/065 273/138.1 |
| 6,406,062 | B1 * | 6/2002 | Brooks | A63F 3/00697 273/138.1 |
| 6,676,126 | B1 * | 1/2004 | Walker | A63F 3/0665 273/139 |
| 6,918,589 | B2 * | 7/2005 | Thibault | A63F 3/065 273/139 |
| 7,311,599 | B2 * | 12/2007 | Knapp | A63F 3/0665 463/17 |
| 7,597,619 | B2 * | 10/2009 | Crivelli | G07F 17/32 463/16 |
| 8,187,072 | B2 * | 5/2012 | Costello | A63F 3/0665 463/16 |
| 8,333,380 | B2 * | 12/2012 | Berkowitz | A63F 3/0665 273/139 |
| 8,597,117 | B2 * | 12/2013 | Bruce | G06Q 30/02 463/25 |
| 8,696,433 | B2 * | 4/2014 | Weller | G06Q 30/02 463/18 |
| 2001/0034643 | A1 * | 10/2001 | Acres | A63F 13/12 705/14.12 |
| 2004/0266514 | A1 * | 12/2004 | Penrice | G07F 17/32 463/18 |
| 2009/0121425 | A1 * | 5/2009 | Berkowitz | A63F 3/0665 273/139 |

* cited by examiner

*Primary Examiner* — Sunit Pandya
(74) *Attorney, Agent, or Firm* — Edmond DeFrank

(57) ABSTRACT

The embodiments disclose an apparatus including at least one device configured for registering, recognizing, and authenticating a player/user of an online lottery scratcher system, at least one device configured for communications between the online lottery scratcher system and at least one digital programmable online lottery scratcher application, at least one player/user wireless touch screen device for interactively interfacing with the at least one digital programmable online lottery scratcher application to display a digital scratch off ticket, and at least one functional system configured for virtual scratching off of a digital scratch off ticket.

20 Claims, 13 Drawing Sheets

ONLINE LOTTERY SCRATCHER SYSTEM

CROSS-REFERENCE TO RELATED APPLICATIONS

This application is based on U.S. Provisional Patent Application Ser. No. 61/778,934 filed Mar. 13, 2013, entitled "Online Lottery Scratcher System", by First Named Inventor William Granich, et al.

BACKGROUND

Lotteries and lottery scratchers offer monetary prizes. They have low odds of winning which can discourage players for buying into the lottery. Lottery scratchers currently do not offer any player interaction or any real-time experiences that reward the player beyond their limited chance of winning. Lotteries and lottery scratcher organization are stand alone and other than contributing part of the ticket sales to education are not aligned with private companies or other charitable organization. This limited business outlook and player experience decreases the potential benefits to all concerned in the lottery market place.

DETAILED DESCRIPTION OF THE INVENTION

Figure 1:
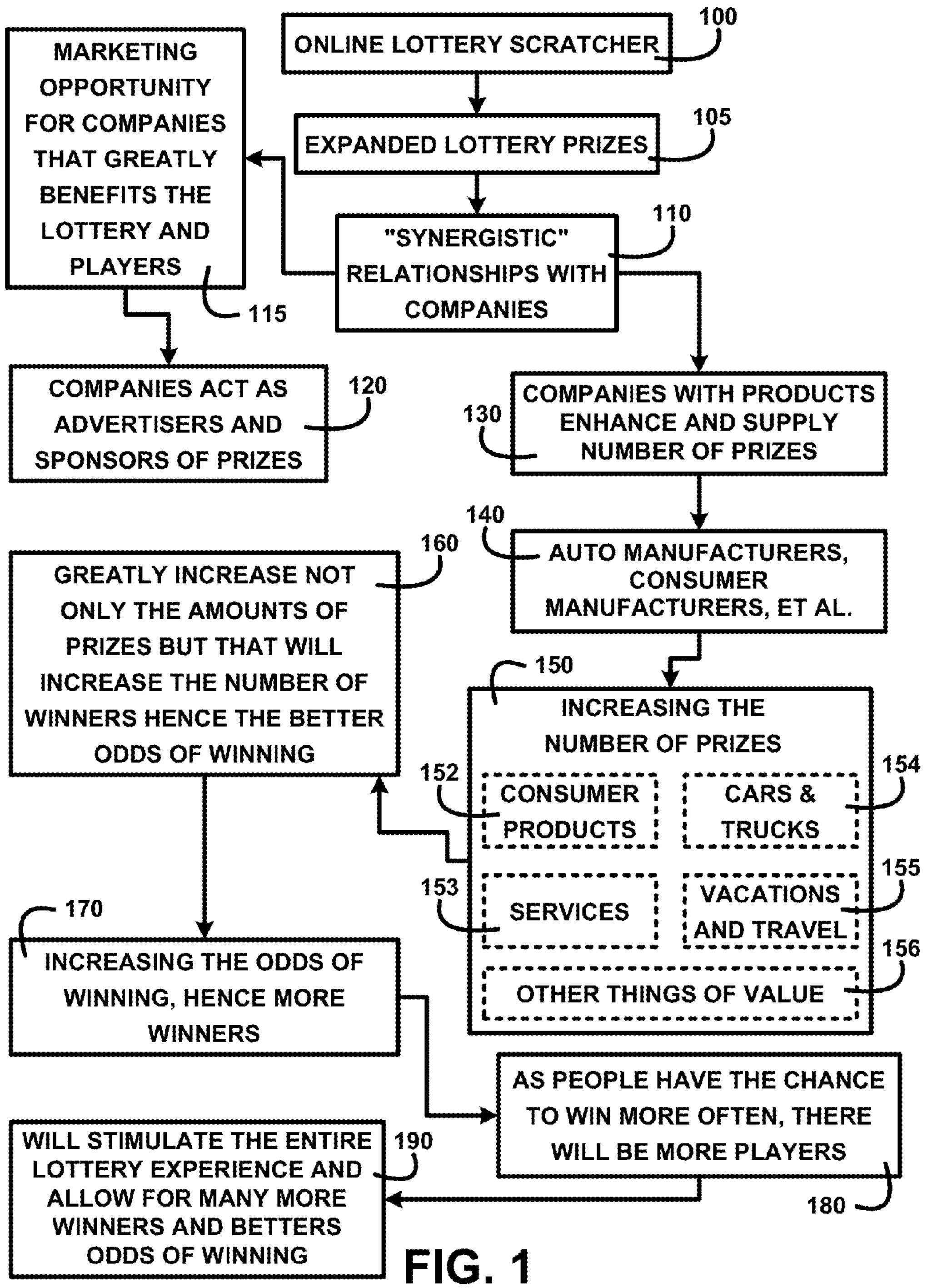
FIG. 1 shows a block diagram of an overview of an online lottery scratcher system of one embodiment.

In a following description, reference is made to the accompanying drawings, which form a part hereof, and in which is shown by way of illustration a specific example in which the invention may be practiced. It is to be understood that other embodiments may be utilized and structural changes may be made without departing from the scope of the embodiments.

It should be noted that the descriptions that follow, for example, in terms of online lottery scratcher system is described for illustrative purposes and the underlying system can apply to any number and multiple type's lottery and game of chance. In one embodiment of the embodiments, the online lottery scratcher can be configured using digital scratch off tickets. The online lottery scratcher system can be configured to include monetary prizes and can be configured to include consumer product, services and other non-monetary types of prizes using the embodiments.

General Overview:

Online Lottery Scratcher System:

The embodiments include expanding the type of prizes, numbers of prizes, increased odds of winning through offering expanded prize pools that include along with monetary prizes, non-monetary prizes in a supplementary or substitute basis. The online lottery scratcher system incorporates synergistic relationships with companies to provide the companies the opportunity to market their products and service in exchange for prize products and services and reduced advertising rates. The addition of prize products and services will increase the number of prizes available to be won by players thus increasing the odds of winning.

In the descriptions that follow the term "scratcher", "online lottery scratcher" and "digital scratch off ticket" are interchangeably used to describe an apparatus that has the meaning of a virtual digital game card (ticket) display where multiple prizes are concealed under a covering mask that can be virtually scratched-off to reveal the prize concealed underneath.

The online lottery scratcher system includes a digital programmable virtual lottery scratcher system, at least one digital programmable application interacting with the digital programmable virtual lottery scratcher system, and at least one player/user system interface using the at least one digital programmable application to communicate between the digital programmable virtual lottery scratcher system and at least one player/user wireless touch screen device on which at least one digital programmable application has been installed.

The player can also earn points or credits by log-in observation of sponsored ads and commercials, participation in on-line lottery scratcher sponsoring company's product surveys and inputting online proof of purchase data like "cereal box tops" to "tooth paste" boxes of lottery scratcher sponsoring companies. The player they will be able to get further credit by typing in purchased products serial # info etc. This provides lottery scratcher sponsoring companies with tangible proof of the effectiveness of the online lottery scratcher system advertising. The online lottery scratcher system gains by the ability to rely less on the number of players' dollars to increase the pot totals. Better odds of winning will produce many more winners. As people have the chance to win more often, there will be more players making the advertising yield to the lottery scratcher sponsoring companies reach a greater market for the same cost.

Companies with products enhance and supply number of prizes, products, services and more things of value like vacations and travel. Will stimulate the entire lottery experience and allow for many more winners and betters odds of winning of one embodiment.

FIG. 1 shows a block diagram of an overview of an online lottery scratcher system of one embodiment. FIG. 1 shows an online lottery scratcher 100 system that provides expanded lottery prizes 105. Expanded lottery prizes 105 are achieved using synergistic relationships with companies 110. This provides additional marketing opportunity for companies that greatly benefit the lottery and players 115. Companies act as advertisers and sponsors of prizes 120. Companies with products enhance and supply number of prizes 130 including for example auto manufacturers, consumer manufacturers, et al. 140. The player/user benefits with increasing the number of prizes 150 including consumer products 152, services 153, cars & trucks 154, vacations and travel 155 and other things of value 156 including cash and non-cash prizes. The synergistic relationships with companies 110 greatly increase not only the amounts of prizes but that will increase the number of winners hence the better odds of winning 160, increasing the odds of winning, hence more winners 170. As people have the chance to win more often, there will be more players 180. The online lottery scratcher 100 system will stimulate the entire lottery experience and allow for many more winners and betters odds of winning 190 of one embodiment.

Figure 2:
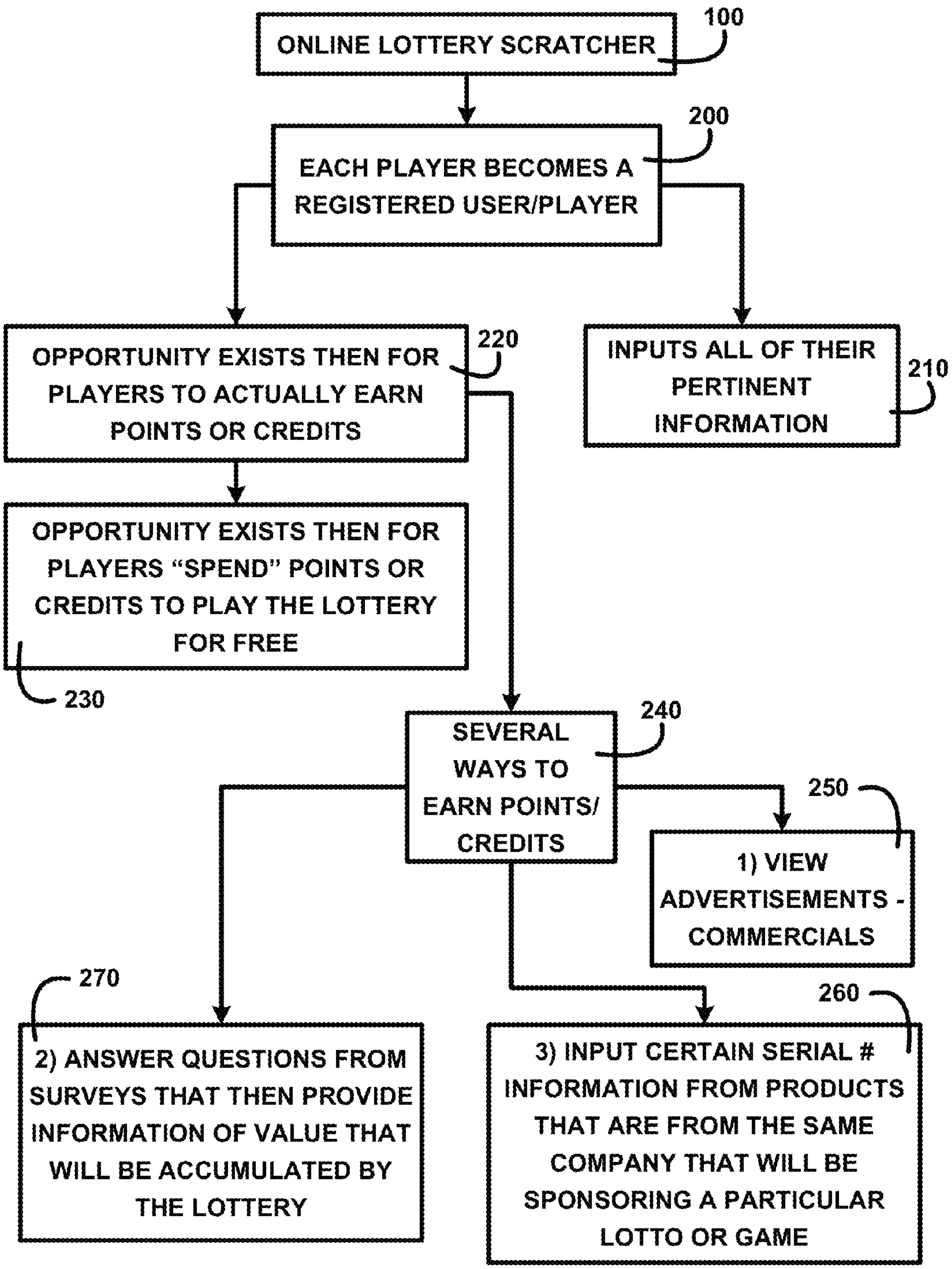
FIG. 2 shows a block diagram of an overview flow chart of player/user registration of one embodiment.

Detailed Description:

FIG. 2 shows a block diagram of an overview flow chart of player/user registration of one embodiment. FIG. 2 shows in one embodiment an application of the online lottery scratcher 100 includes for example where each player becomes a registered user/player 200 and inputs all of their pertinent information 210. The opportunity exists then for players to actually earn points or credits 220. The opportunity exists then for players to actually earn points or credits 220 is used for increasing the number of prizes, increasing the odds of winning, hence more winners, and providing a synergistic marketing opportunity for companies that greatly benefits the lottery and players.

1) The opportunity exists then for players "spend" points or credits to play the lottery for free 230. In the online lottery scratcher system several ways to earn points/credits 240 including view advertisements—commercials 250, answer questions from surveys that then provide information of value that will be accumulated by the lottery 270, and input certain serial # information from products that are from the same company that will be sponsoring a particular lotto or game 260 of one embodiment.

Figure 3:
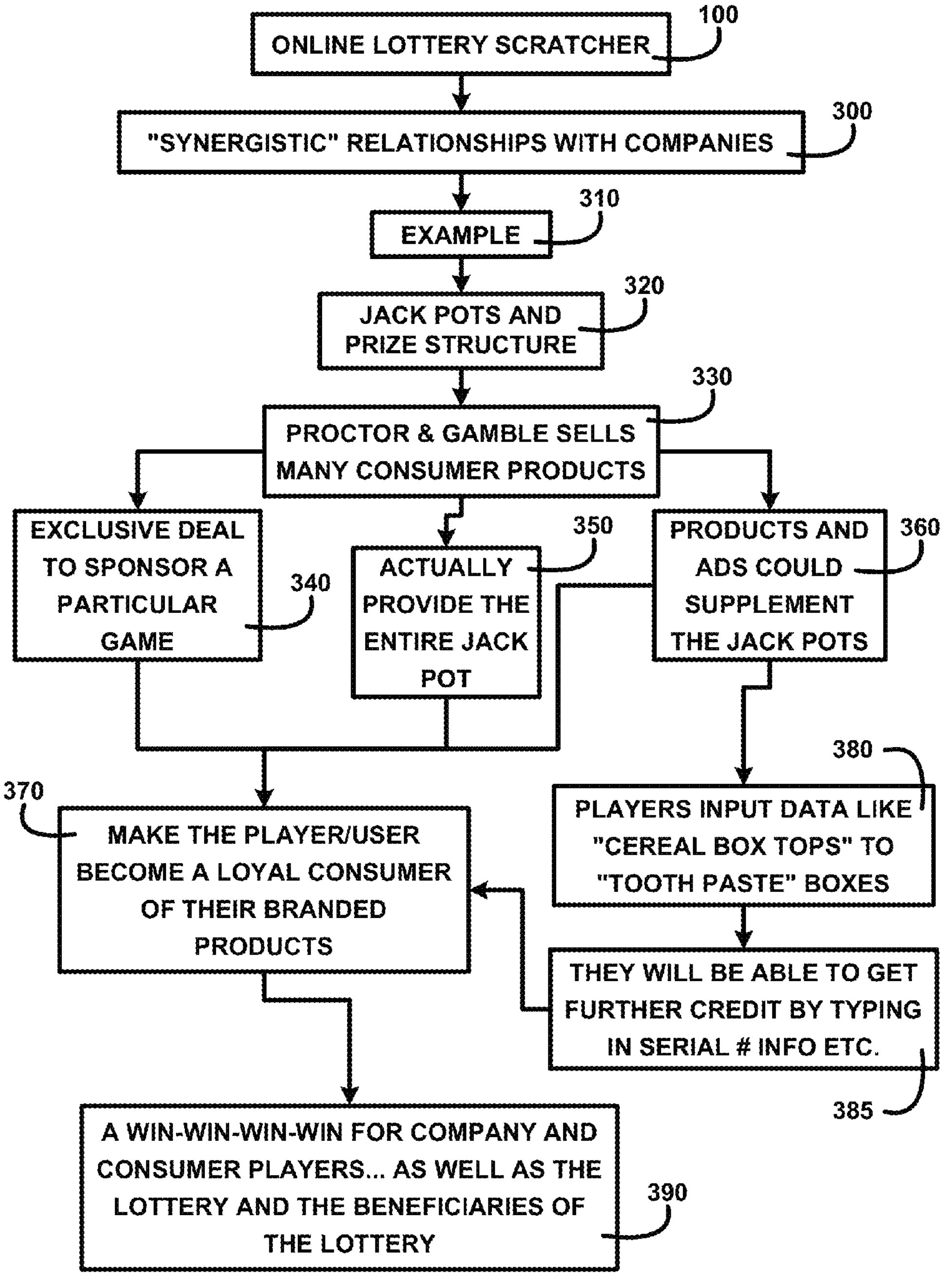
FIG. 3 shows a block diagram of an overview flow chart of synergistic relationships with companies of one embodiment.

Synergistic Relationships with Companies:

FIG. 3 shows a block diagram of an overview flow chart of synergistic relationships with companies of one embodiment. FIG. 3 shows in one embodiment synergistic relationships with companies in the online lottery scratcher 100 system. Synergistic relationships with companies 300 for example 310 companies providing jack pots and prize structure 320. The online lottery scratcher system will establish business relationships with companies, as previously explained with cars & trucks from auto manufacturers, consumer manufacturers, et al. It will be progressing the lottery industry into "synergistic" relationships with companies as they would greatly increase not only the amounts of prizes but that will increase the number of winners hence the better odds of winning. As people have the chance to win more often, there will be more players etc. Etc. Their products and ads could supplement the jackpots 360 or actually provide the entire jackpot 350 depending on the structure. But each game will obviously be structured so as to benefit all of one embodiment.

For example proctor & gamble sells many consumer products 330 and could achieve a synergistic relationship by doing an exclusive deal to sponsor a particular game 340. Several ways to earn credits to play their lotto games for free. In one embodiment there is a place player's input data like "cereal box tops" to "tooth paste" boxes 380 that make the player/user become a loyal consumer of their branded products 370 as they will be able to get further credit by typing in serial # info etc. 385. A win-win-win-win for company and consumer players . . . as well as the lottery and the beneficiaries of the lottery 390 of one embodiment.

Figure 4:
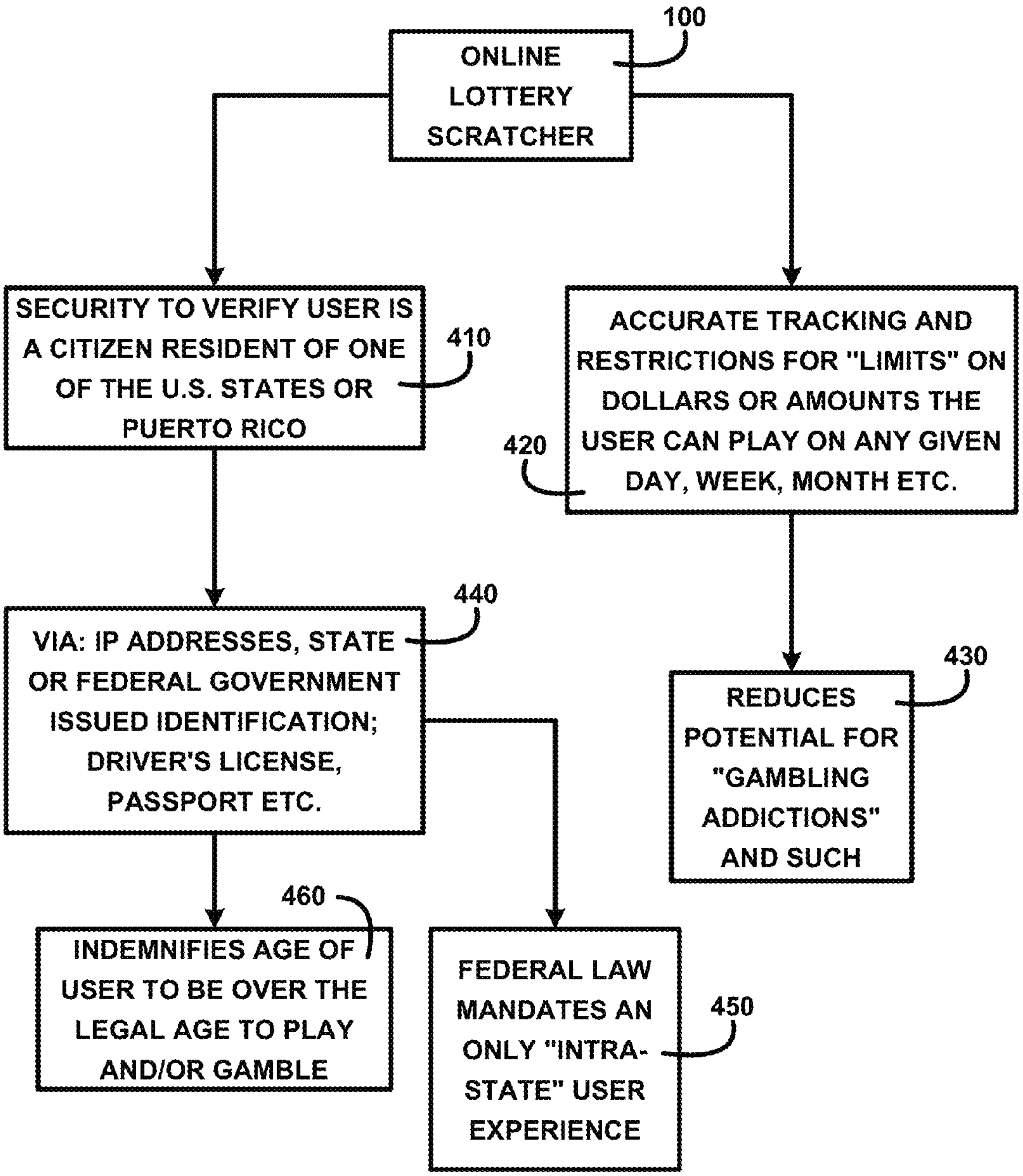
FIG. 4 shows for illustrative purposes only an example of accurate tracking and restrictions of one embodiment.

Accurate Tracking and Restrictions:

FIG. 4 shows for illustrative purposes only an example of accurate tracking and restrictions of one embodiment. FIG. 4 shows in one embodiment accurate tracking and restrictions in the online lottery scratcher 100 system. Accurate tracking and restrictions for "limits" on dollars or amounts the user can play on any given day, week, month etc. 420. This reduces potential the concern for "gambling addictions" and such 430. The system includes security to verify user is a citizen resident of one of the U.S. states or Puerto Rico 410 via: IP addresses, state or federal government issued identification; driver's license, passport etc. 440. In this embodiment the system indemnifies age of user to be over the legal age to play and/or gamble 460. The system is also used for compliance where federal law mandates an only "intra-state" user experience 450 of one embodiment.

Figure 5:
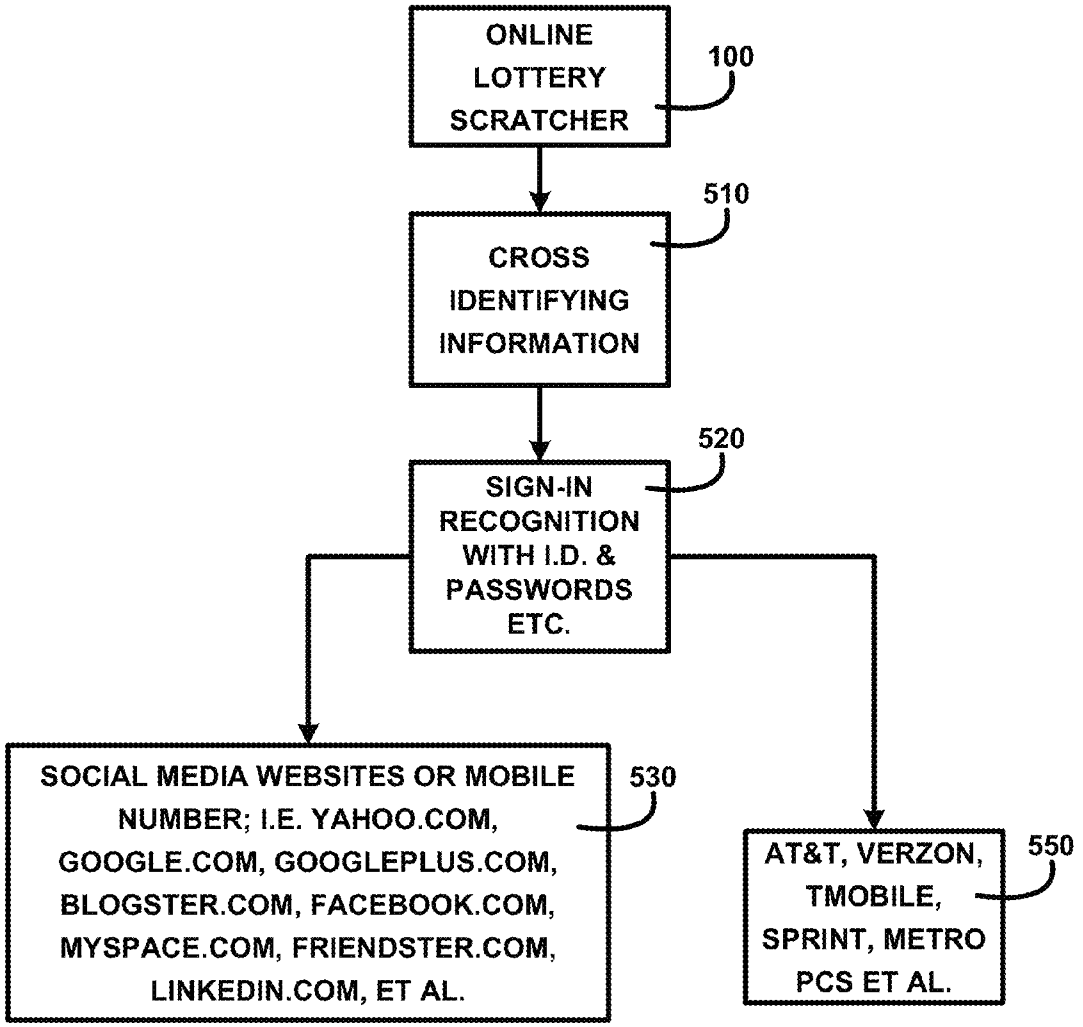
FIG. 5 shows for illustrative purposes only an example of cross identifying information of one embodiment.

Cross Identifying Information:

FIG. 5 shows for illustrative purposes only an example of cross identifying information of one embodiment. FIG. 5 shows in one embodiment cross identifying information used in the online lottery scratcher 100 system. Cross identifying information 510 includes the use of sign-in recognition with I.D. & passwords etc. 520. Cross identifying information 510 includes checks on social media websites or mobile number; i.e. yahoo.com, google.com, googleplus.com, blogster.com, facebook.com, myspace.com, friendster.com, linkedin.com, et al. 530 and AT&T, Verizon, T*mobile, sprint, Metro PCS, et al. 550 of one embodiment.

Figure 6:
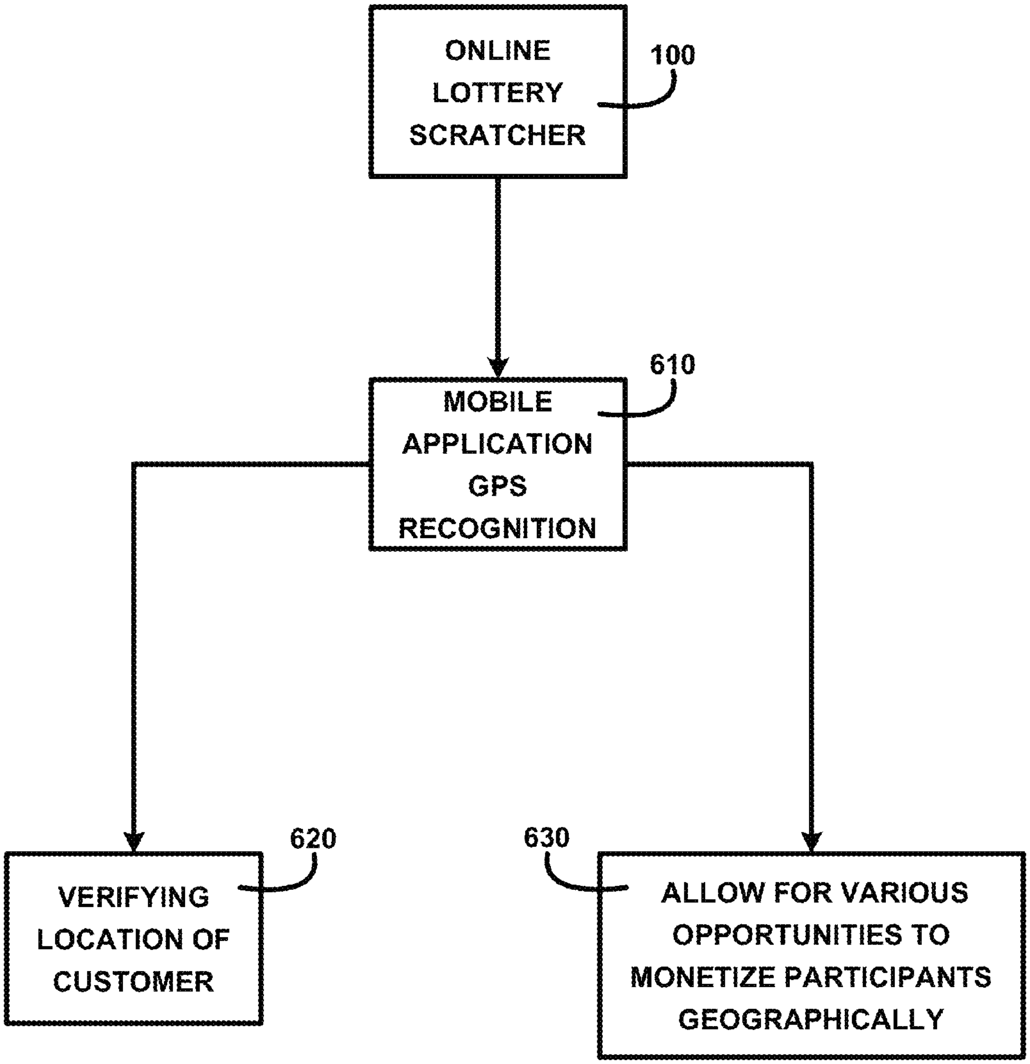
FIG. 6 shows for illustrative purposes only an example of mobile application GPS recognition of one embodiment.

Mobile Application GPS Recognition:

FIG. 6 shows for illustrative purposes only an example of mobile application GPS recognition of one embodiment. FIG. 6 shows in one embodiment mobile application GPS recognition used in the online lottery scratcher 100 system. Mobile application GPS recognition 610 is used to verifying location of customer 620 to allow for various opportunities to monetize participants geographically 630. It also is used to check compliance with intra-state environments of one embodiment.

Figure 7:
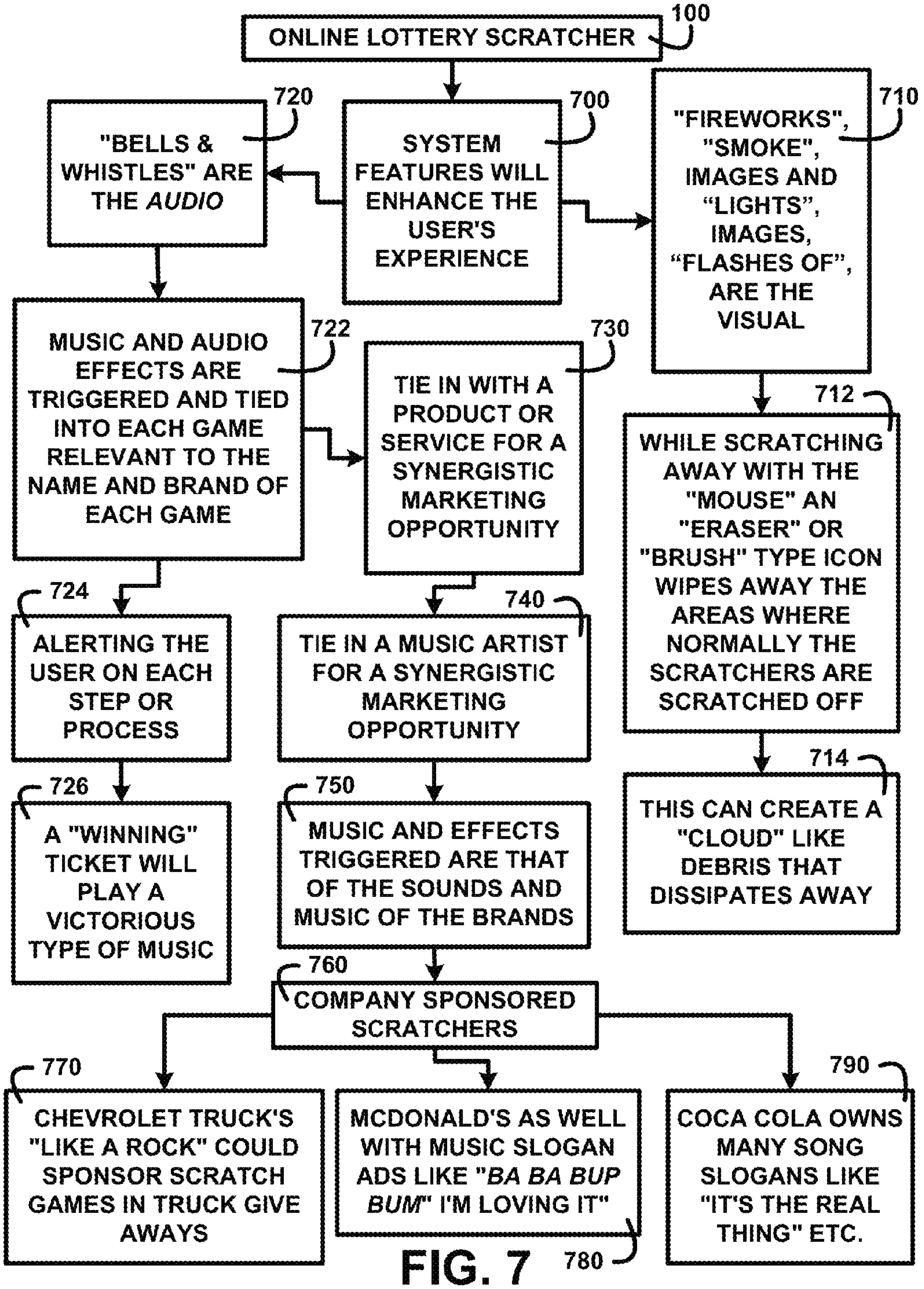
FIG. 7 shows for illustrative purposes only an example of system features will enhance the user's experience of one embodiment.

System Features will Enhance the User's Experience:

FIG. 7 shows for illustrative purposes only an example of system features will enhance the user's experience of one embodiment. FIG. 7 shows in one embodiment system features will enhance the user's experience using the online lottery scratcher 100 system. In one embodiment system features will enhance the user's experience 700 using fireworks, "smoke", images and "lights", images, "flashes of", are the visual 710 while scratching away with the "mouse" an "eraser" or "brush" type icon wipes away the areas where normally the scratchers are scratched off 712. Visual features can be used where this can create a "cloud" like debris that dissipates away 714. In another embodiment sounds including bells & whistles are the audio 720 enhancements. Music and audio effects are triggered and tied into each game relevant to the name and brand of each game 722 alerting the user on each step or process 724 for example a "winning" ticket will play a victorious type of music 726. These features are used to tie in with a product or service for a synergistic marketing opportunity 730. Companies have many advertisement campaigns that have "jingles" and/or song snippets that could play as audio effects and bells and whistles. Company sponsored scratchers for example where by music and effects are triggered including the sounds and music of the brands.

This includes a feature to tie in a music artist for a synergistic marketing opportunity 740. Music and effects triggered are that of the sounds and music of the brands 750 of company sponsored scratchers 760. For example Chevrolet trucks "like a rock" could sponsor scratch games in truck giveaways 770. McDonald's as well with music slogan ads like "ba ba bup bum I'm loving it" 780 and Coca Cola owns many song slogans like "it's the real thing" etc. 790 of one embodiment.

Another functionality will be; the ability for companies of products & services to put up some of the prizes or money whereby their benefit is in a partnership manner. The lottery then will rely less on the number of players' dollars to increase the pot total but will also benefit by a company putting up their products or services . . . . Hence yielding even more dollars and/or prizes for more winners. The more winners and opportunities the more players and the result is a net higher profit value for the lottery and its beneficiaries, and everybody wins. I.e. In the state of California the beneficiary group is the state's school and education system. In Pennsylvania the main beneficiary is; "the AAAS administer senior centers across the state and provide a wide variety of services, including; assessments and program referral, home-delivered meal, health insurance counseling, ombudsman services and legal assistance, protective services, transportation" of one embodiment.

The online lottery scratcher system can offer specialized play through various domains including for example Scratch4cars.com and Scratchforcars.com.

- Event tie-ins like Scratch4tickets.com Scratchfortickets.com customized to the entertainment and movie industry that consistently spend millions of dollars marketing, advertising and publicity for each film release.
- Movie studios will be able to provide free tickets to new movie releases. These will be the lower value scratcher winners when for example the user doesn't win a new car or truck. The entertainment company will love to contribute because in most cases a family has more than 2 people, so even if they "win" 2 tickets they will bring the rest of the family to purchase tickets.
- Travel and vacation tie-ins with domains that explain this like; Scratch4vacations.com, Scratchforvacations.com, Click4prizes.com of one embodiment.

The benefit is to everyone, the more cash and prizes the more winners and happy players, more products and services are sold and of course the more money raised for the lottery and all of the lottery's beneficiaries. The overall macro perspective of how this will affect the lotteries and more importantly the "instant winning" games like scratchers. When more companies of products & services put up partnership deals, much in the same fashion as the "coupon & groupon" equivalent world, the overall net result will be a higher number or percentage of winners per scratch or draw. Using the online lottery scratcher system it could safely computed and advertised that the chances of winning some prize is for example as small as in say "1 in 4". More people will be attracted to play, yielding recording revenues and benefits to all of one embodiment.

Online lottery scratcher system mobile GPS operation that know where you're playing from and have the capability of offering deals from vendors in that area. This maximizes any potential opportunity for a sale for that vendor since the player is playing in their general area of one embodiment.

More graphic type capabilities can for example include a scratcher cover image on each section that morphs when scratched to an scratcher sponsoring company ad image in the same space building suspense for example for 10 seconds and then reveals the prize or number leading to a win. The advanced graphic capabilities will provide additional advertising, player experience and excitement in the category of "fireworks" of one embodiment.

The idea of a "scratch ticket" when selected amongst a list or group of others, that pops out and twirls around or "dances" to the beat of a song. This could be achieved in a software such as "java" or an equivalent of one embodiment.

The ability for the purchaser to buy a block of tickets and distribute them to multiple friends or family via "email addresses" or any social media network. The ability that a purchaser to be able to play as a part of a "group" of people which would eliminate any controversy that leads to legal actions of one embodiment.

Many people buy lottery tickets in groups of people, like a group of friends or co-workers. This ability will eliminate the potential for legal actions should any particular player be excluded from any particular drawing or bulk purchase. This would register the identities, either via names, or email addresses or social network identities, therefore assuring their inclusion in the overall purchase of the tickets hence guaranteeing their participation. This functionality and application can eliminate the potential for disagreements or legal actions of one embodiment.

User Qualifying Parameters:

Qualifying the users using several different parameters. These types of user qualifying parameters would allow the website to collect relevant data and information from each user to better provide more targeted games and games with sponsors seeking to reach that specific audience of one embodiment.

- i.e. one user will like "trucks" and outdoor things. Another user could be identified as a "female" that is more interested in beauty and cosmetic product types of goods and services. Another could be a younger user with interests pertaining to things of interest relevant geared towards the companies that sell, market and advertise products more suited to them of one embodiment.

Online scratchers with ties to financial oriented companies for example, users that open an account with their lottery and originally fund the account with money, could actually be funding an account that is tied into the lottery company with a partner company like a bank or brokerage company. What this does is introduces the new user/player to the financial institution by then having a new account or "relationship" with this financial company. This opens up the possibilities for further interest in the goods or services that this company or institution offers. This is not limited to banks and brokerages. This could also be with "retail" companies via a "debit" card with what is usually associated with visa, MasterCard, Discover Card or American Express and the up and coming new PayPal which is making inroads to relationships with various new retailers and outlets. What comes to mind with most potent potential currently would be a "PayPal" partnership, for example this would ultimately increase PayPal's user/customer base and overall awareness of their offerings and abilities. With this, PayPal could more effectively make inroads to more retailers since they could reference a broader user base which ultimately is what's attractive to any retailer or goods and services seller that PayPal is trying to establish a new account with of one embodiment.

The online lottery scratcher system can make for an explosion and advancement for many different products and services companies as well as increase the number of players interested to play lottery since the chances of winning anything will ultimately be greater because everyone benefits including the lottery entities and their beneficiaries.

the user players like that the overall percentages to win anything dramatically increases with the participations of products and services companies.

the products & services companies like their benefits of more customers and awareness hence creating more opportunities on several different platforms for them to monetize the increases.

the lottery entities love this whole thing because it ultimately generates more revenues and profits for them.

the "beneficiaries" to the lottery profits benefit greatly with hugely increased revenues.

It becomes a win-win-win-win of one embodiment.

Figure 8:
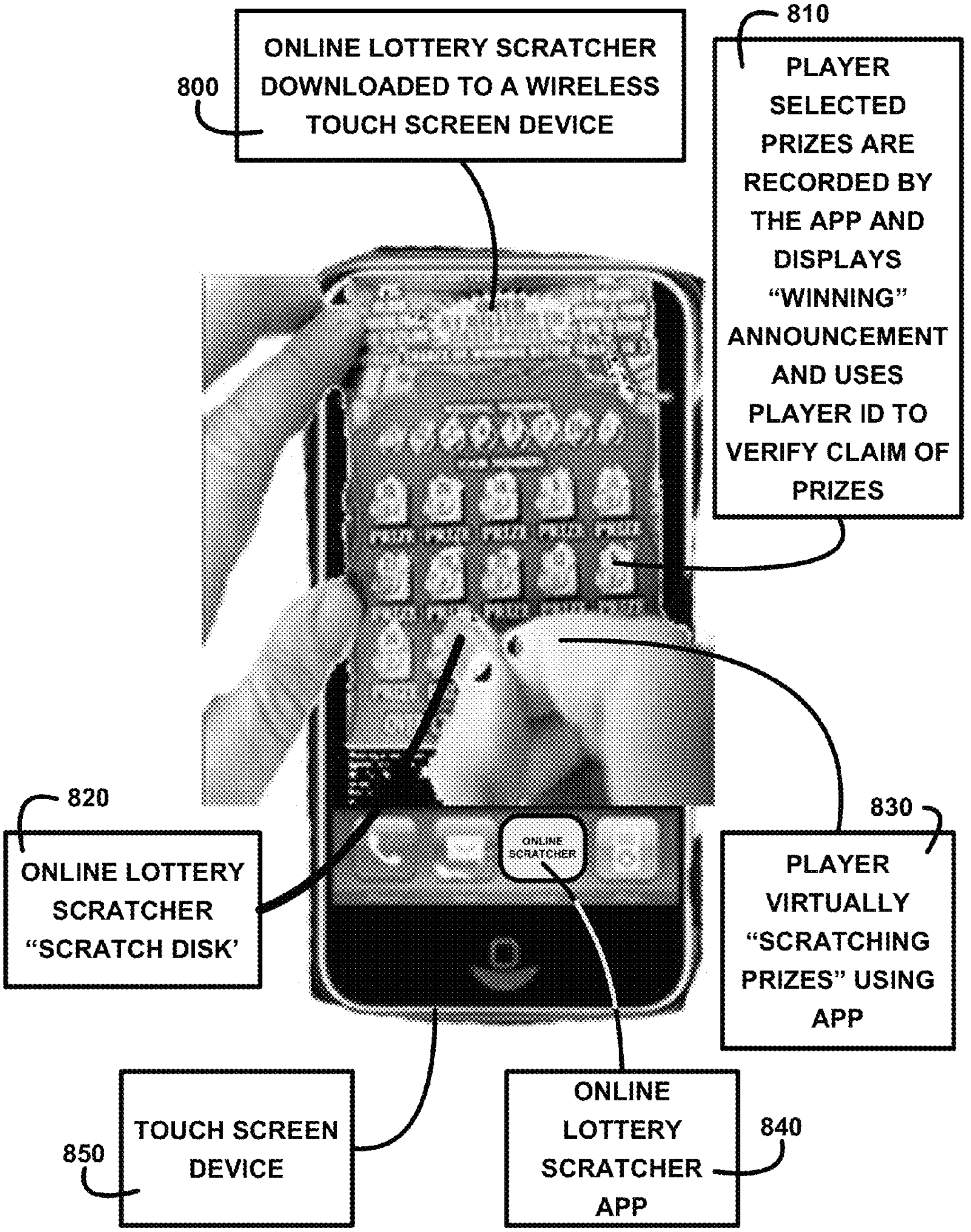
FIG. 8 shows for illustrative purposes only an example of a scratcher downloaded to a wireless touch screen device of one embodiment.

Scratcher Downloaded to a Wireless Touch Screen Device:

FIG. 8 shows for illustrative purposes only an example of a scratcher downloaded to a wireless touch screen device of one embodiment. FIG. 8 shows in one embodiment scratcher downloaded to a wireless touch screen device. The user logins into the application and the online lottery scratcher system processes an online lottery scratcher downloaded to a wireless touch screen device 800. Player selected prizes are recorded by the app and displays "winning" announcement and uses player id to verify claim of prizes 810. The user can use in one embodiment an online lottery scratcher "scratch disk' 820 where the player virtually "scratching prizes" using app 830. The online lottery scratcher app 840 is downloaded into a touch screen device 850 by the user from the online lottery scratcher website or other internet sites or through a purchase of the application through a retailer of one embodiment.

Figure 9:
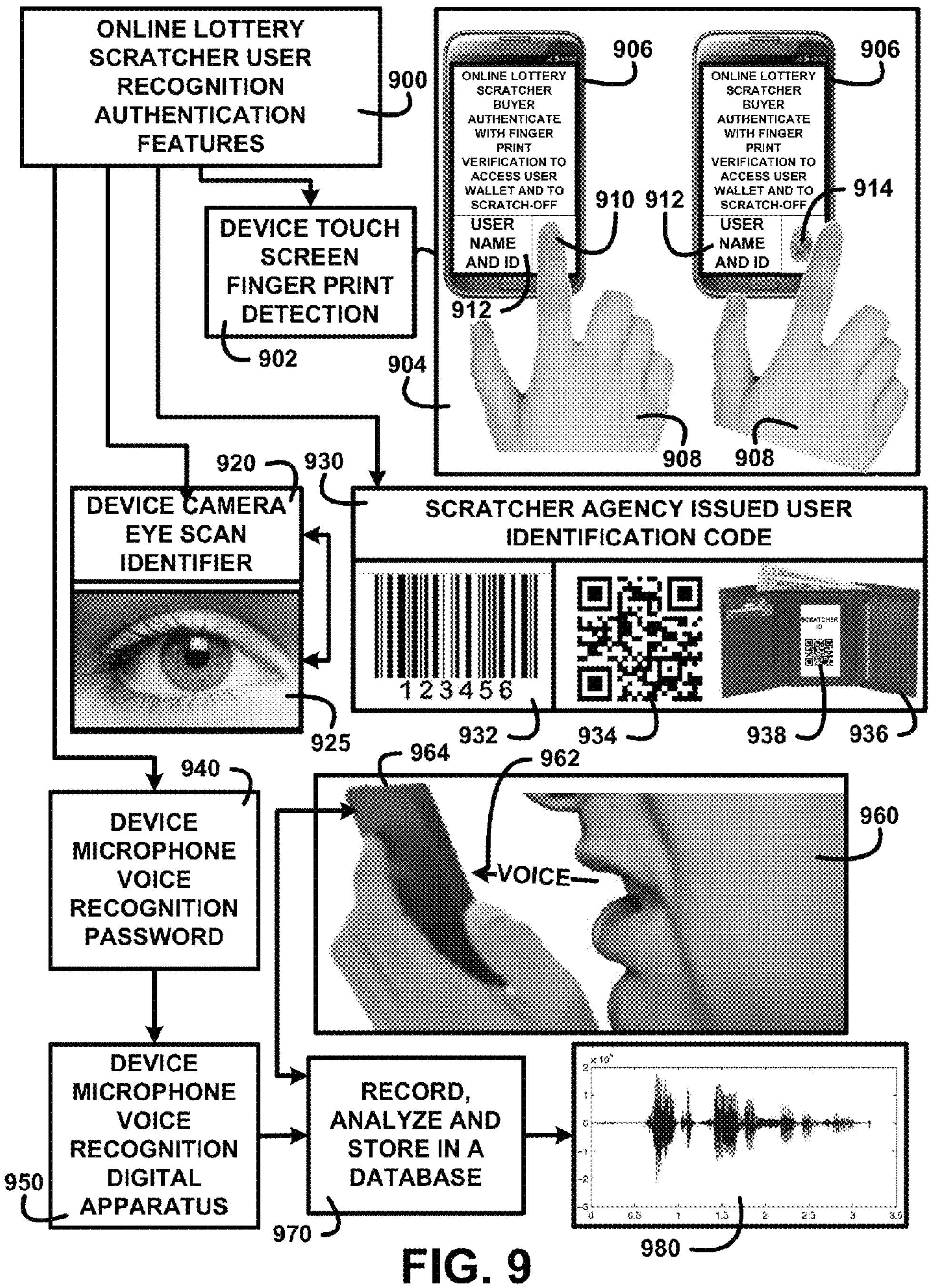
FIG. 9 shows for illustrative purposes only an example of user recognition authentication features of one embodiment.

User Recognition Authentication Features:

FIG. 9 shows for illustrative purposes only an example of user recognition authentication features of one embodiment. FIG. 9 shows in one embodiment user recognition authentication features. The online lottery scratcher user recognition authentication features 900 includes in one embodiment a device touch screen finger print detection 902 system. A user entering finger print 904 includes the user name and ID 912 inputted by the user. The device touch screen finger print detection 902 system includes in one embodiment utilization of a device 906 including touch screen and pressure/temperature features. The device will record, analyze and store in a database the user finger print 914 and compare the record finger print with any user hand and finger 908 that seeks authentication to be recognized of one embodiment.

The online lottery scratcher user recognition authentication features 900 include in one embodiment a device camera eye scan identifier 920. The device camera eye scan identifier 920 captures, records, analyzes and stores in a database a user eye camera image 925 and uses the details of the eye image to compare subsequent user eye images to authenticate and recognize the authorized user of one embodiment.

The online lottery scratcher user recognition authentication features 900 include in one embodiment a scratcher agency issued user identification code 930. The scratcher agency issued user identification code 930 includes using a barcode 932, QR code 934 or other code symbol system. The scratcher agency issued user identification code 930 in one embodiment can be downloaded by the user for example to place in the user wallet 936. In another embodiment a scratcher agency issued user identification code downloadable printed card 938 can be used by the user to scan using the device camera to be recognized and authenticate the user is authorized to use this account of one embodiment.

The online lottery scratcher user recognition authentication features 900 include in one embodiment includes a device microphone voice recognition password 940. A device microphone voice recognition digital apparatus 950 includes a user speaking the desired password into device microphone 960. The voice recognition digital apparatus records the user voice characteristics 962 using a device with microphone and voice recognition digital application 964. The device with microphone and voice recognition digital application 964 is used to record, analyze and store in a database 970 the user voice characteristics 962. The user voice characteristics 962 can be shown as a voice recognition voice password data record in graphic display 980 of one embodiment.

Figure 10:
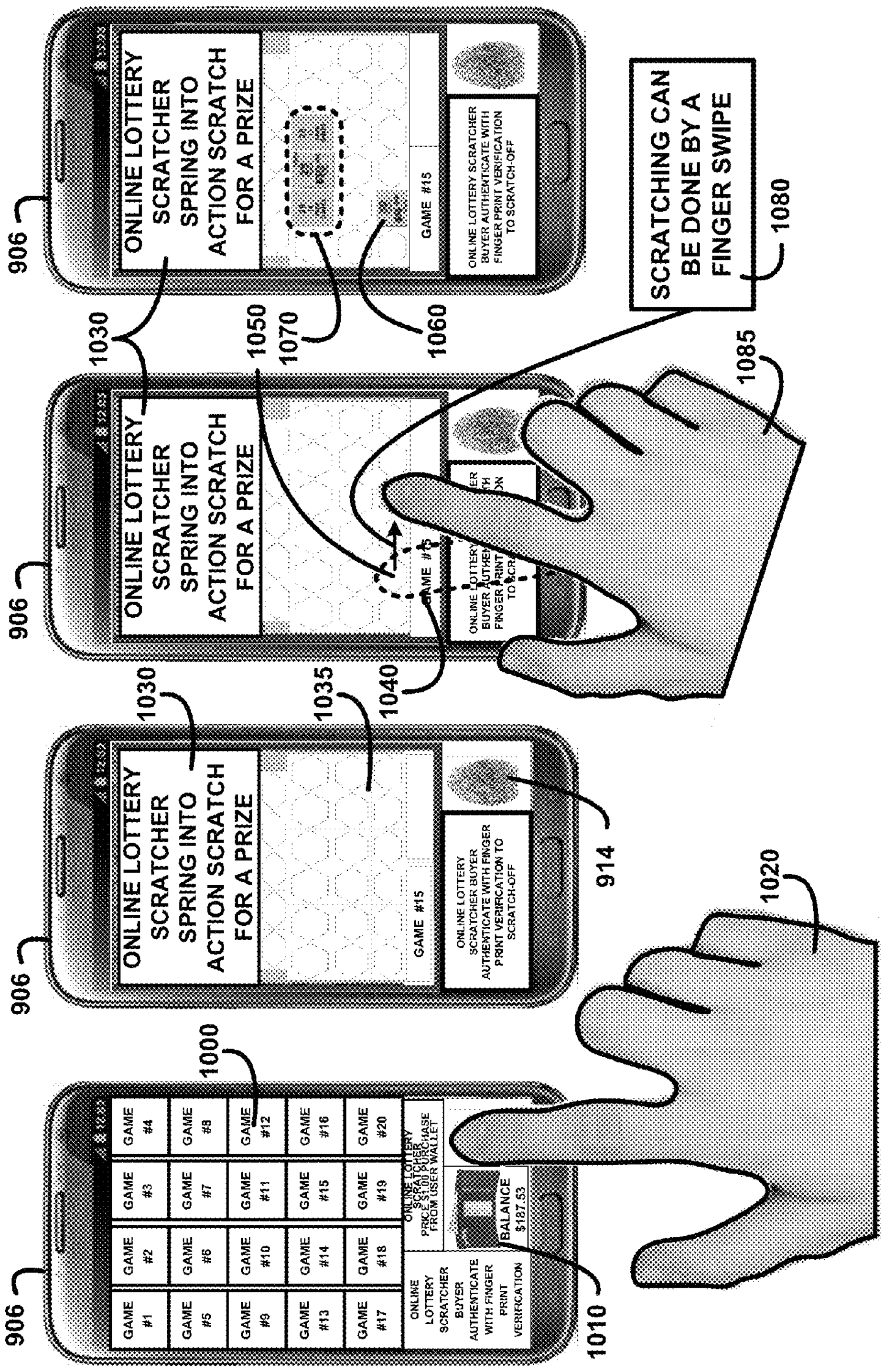
FIG. 10 shows for illustrative purposes only an example of scratching can be done by a finger swipe of one embodiment.

Scratching can be Done by a Finger Swipe:

FIG. 10 shows for illustrative purposes only an example of scratching can be done by a finger swipe of one embodiment. FIG. 10 shows in one embodiment scratching can be done by a finger swipe using the device 906 including touch screen and pressure/temperature features. A downloaded from the online lottery scratcher system will display online lottery scratcher game selections #1-20 displayed on the user device 1000. A user taps game selected to play then in one embodiment a user enters fingerprint to authorize payment from the user wallet 1020. The device displays an online lottery scratcher price $1.00 purchase from user wallet. A user taps user wallet to pay for scratcher game selected 1010.

The user can win free games as a prize. The balance of unused free games is shown in the user wallet balances. Free game prizes increases the amount of play a user can experience without taking away from cash they may need to pay bills. This feature helps to reduce a costly gambling habit. At the same time it provides the companies greater access to players to advertise. This feature also provides an opportunity to open online lottery scratcher systems in states and locales where winning cash might not be permitted. In most areas winning prizes is legal and not prohibited. Free game play will not be considered wagering or a game of chance. The companies can still advertise and the online lottery scratcher system operators still receive advertising revenue.

An online lottery scratcher buyer authenticate with finger print verification is used and a user selected game #15 downloaded to the user device 1030. The user finger print displayed 914 is used to compare with the finger print provided. A game #15 prize boxes displayed 1035 on the device is reviewed by a user to decide where to begin in one embodiment a process where scratching can be done by a finger swipe 1080. The process includes a user finger placed on box to open 1050, then a user swipes finger 1040 across the box and the process clears the box covering showing a box opened to show prize in box 1060. The finger swipe scratching embodiment includes an instance where a user finger can swipe multiple boxes 1085 and multiple boxes can be opened with one swipe 1070 of one embodiment.

Figure 11A:
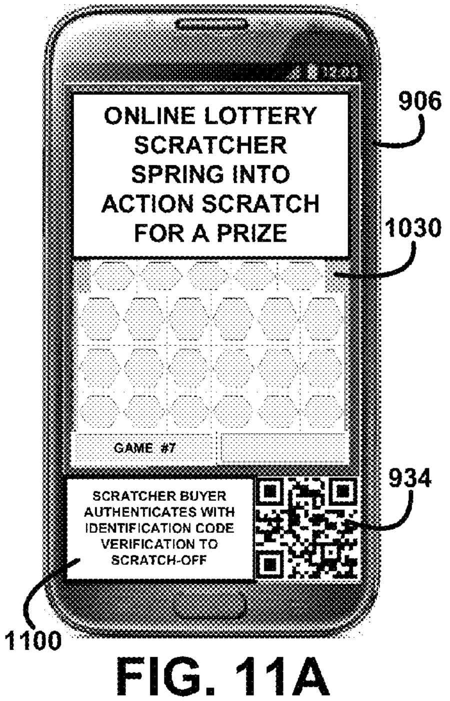
FIG. 11A shows for illustrative purposes only an example of an identification code verification to scratch-off of one embodiment.

Identification Code Verification to Scratch-off:

FIG. 11A shows for illustrative purposes only an example of an identification code verification to scratch-off of one embodiment. FIG. 11A shows in one embodiment an identification code verification to scratch-off using the device 906. Shown is the QR code 934 issued to the user. A user selected game #7 downloaded to the user device 1030 will be playable and scratchable when a scratcher buyer authenticates with identification code verification to scratch-off 1100 of one embodiment.

Figure 11B:
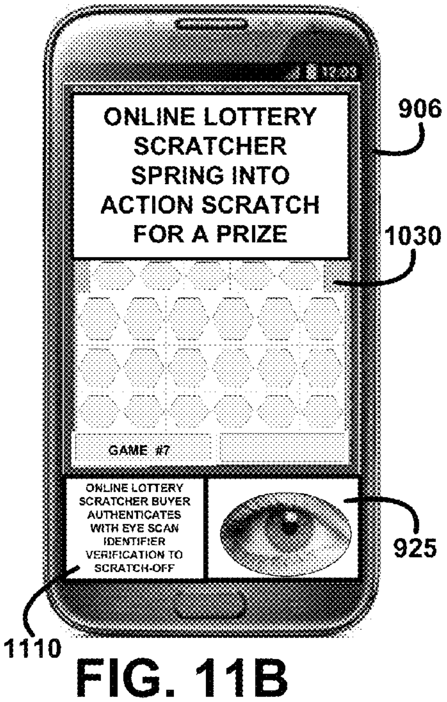
FIG. 11B shows for illustrative purposes only an example of an eye scan identifier verification to scratch-off of one embodiment.

Eye Scan Identifier Verification to Scratch-off:

FIG. 11B shows for illustrative purposes only an example of an eye scan identifier verification to scratch-off of one embodiment. FIG. 11B shows in one embodiment eye scan identifier verification to scratch-off including using a device 906 including a camera. A user selected game #7 downloaded to the user device 1030 becomes playable and scratchable when the user using the device camera images the user's eye and it is successfully is compared to the user eye camera image 925 stored on the device. The online lottery scratcher buyer authenticate with eye scan identifier verification to scratch-off 1110 is used to recognize the user authorized to use the account of one embodiment.

Figure 11C:
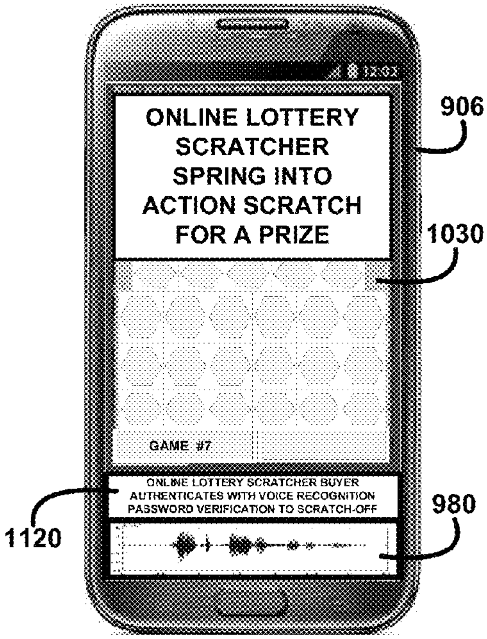
FIG. 11C shows for illustrative purposes only an example of a voice recognition password verification to scratch-off of one embodiment.

Voice Recognition Password Verification to Scratch-off:

FIG. 11C shows for illustrative purposes only an example of a voice recognition password verification to scratch-off of one embodiment. FIG. 11C shows in one embodiment voice recognition password verification to scratch-off using a device 906 including a microphone. A user selected game #7 downloaded to the user device 1030. The user speaking into the device microphone says the password. The device voice recognition password verification application compares this with the voice recognition voice password data record in graphic display 980. If the voice recognition is verified then the online lottery scratcher buyer authenticate with voice recognition password verification to scratch-off 1120 is cleared and the user can begin scratching the prize boxes of one embodiment.

Figure 12:
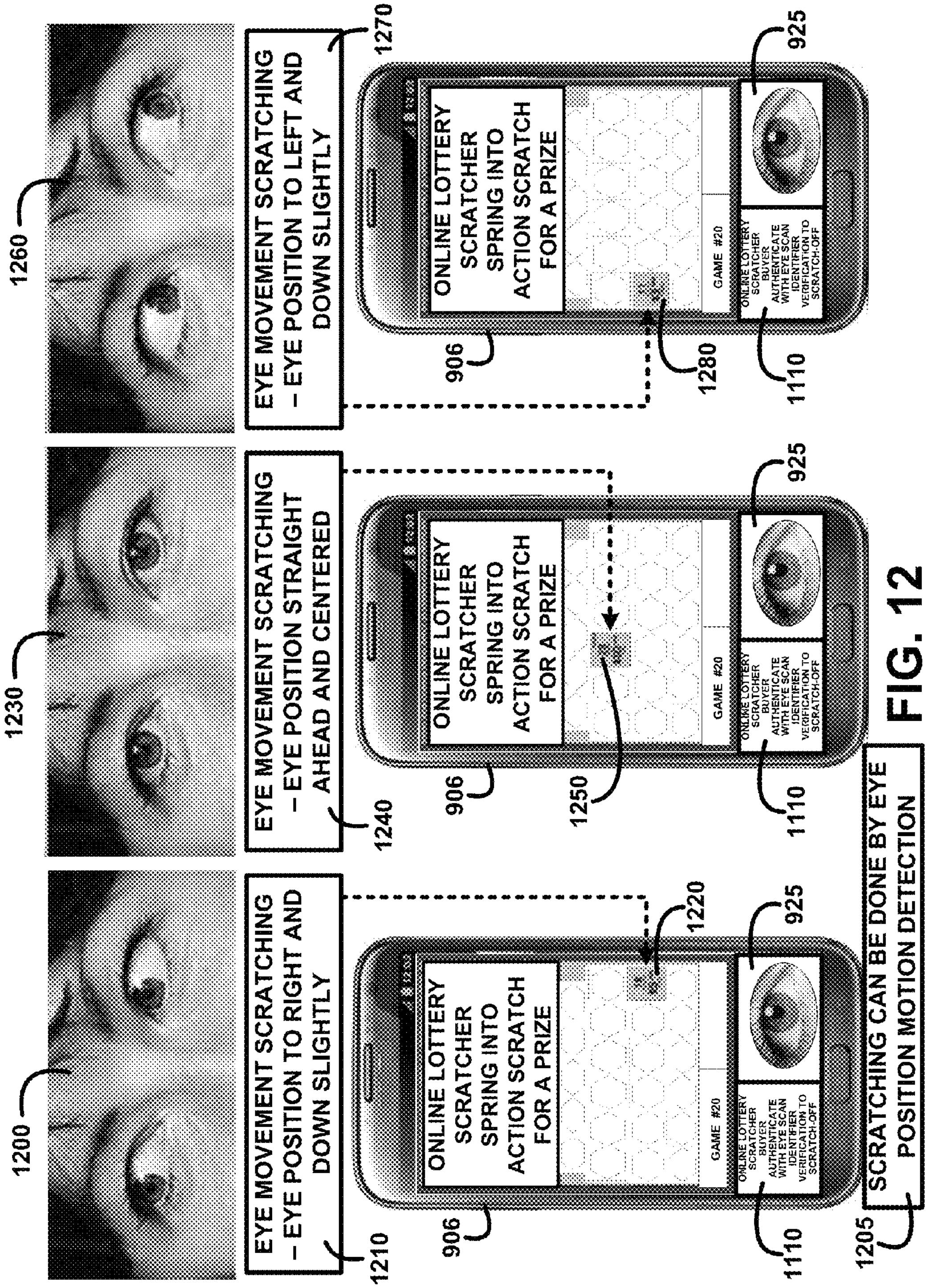
FIG. 12 shows for illustrative purposes only an example of scratching by eye position motion detection of one embodiment.

Scratching by Eve Position Motion Detection:

FIG. 12 shows for illustrative purposes only an example of scratching by eye position motion detection of one embodiment. FIG. 12 shows in one embodiment scratching by eye position motion detection. In the illustration is shown an eye movement right image 1200. An eye movement scratching—eye position to right and down slightly 1210 is captured by the camera of the device 906. In these illustrations it should be remembered that the eyes face the camera and in this illustration appear opposite to the directions left and right of one embodiment.

Scratching can be done by eye position motion detection 1205 where the online lottery scratcher buyer authenticate with eye scan identifier verification to scratch-off 1110 is used to recognize the user eye camera image 925. The eye movement scratching—eye position to right and down slightly 1210 is used where a user eye movement scratches open prize box on right side lower than the center 1220. User eye movements may include a box selection number of rapid blinks or eye closure to activate the swipe. An eye movement center image 1230 is used for eye movement scratching—eye position straight ahead and centered 1240 and a user eye movement scratches open prize box in center position 1250. An eye movement left image 1260 is used for eye movement scratching—eye position to left and down slightly 1270 and a user eye movement scratches open prize box on the left side lower than the center position 1280 of one embodiment.

Figure 13:
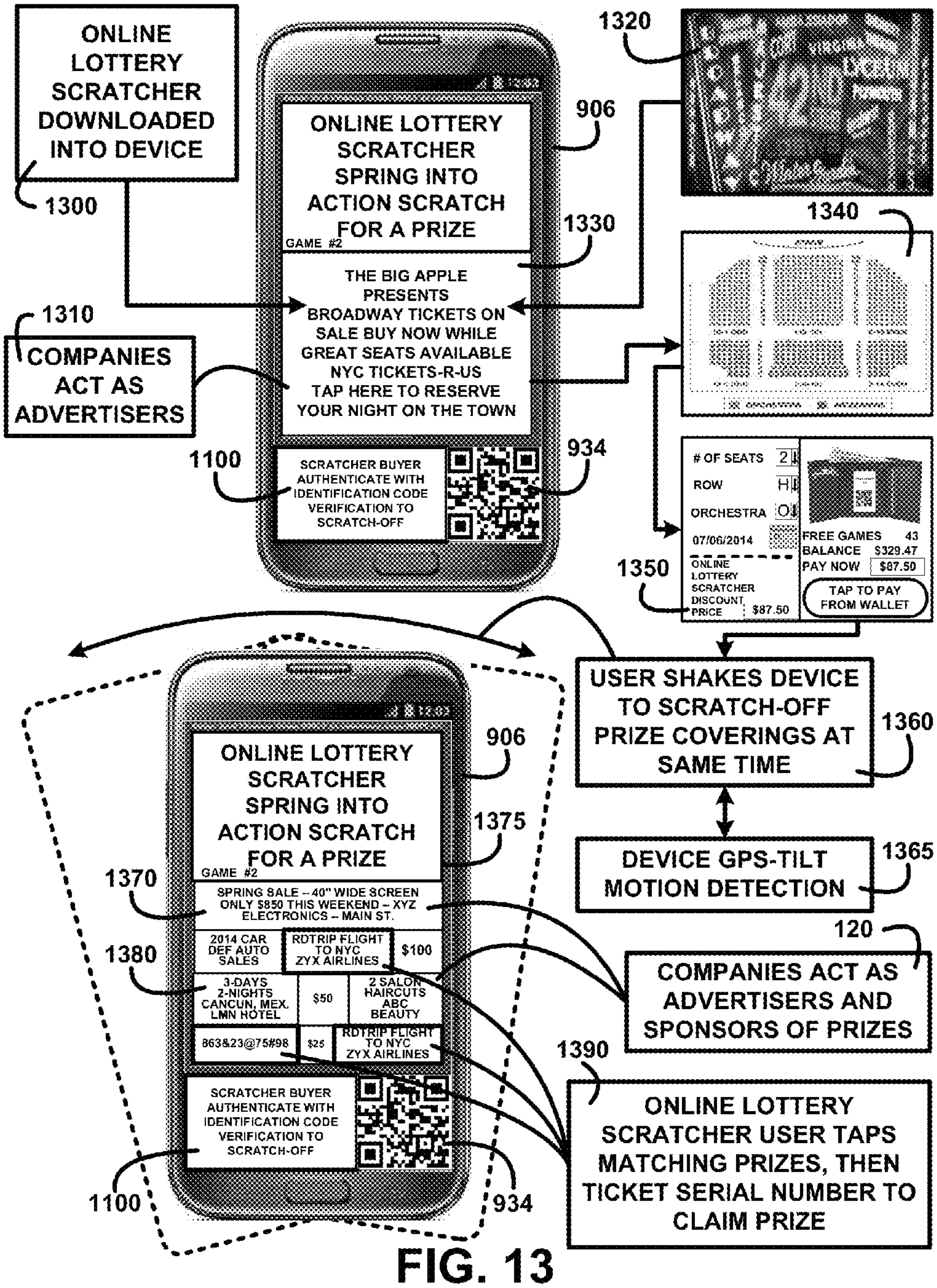
FIG. 13 shows for illustrative purposes only an example of shaking device to scratch-off prize coverings of one embodiment.

Shaking Device to Scratch-off Prize Coverings:

FIG. 13 shows for illustrative purposes only an example of shaking device to scratch-off prize coverings of one embodiment. FIG. 13 shows in one embodiment shaking device to scratch-off prize coverings of an online lottery scratcher downloaded into device 1300. The device 906 including device GPS-tilt motion detection 1365 can use the QR code 934 scratcher buyer authenticate with identification code verification to scratch-off 1100 of one embodiment.

Companies act as advertisers 1310 including placing for example an opening ad screen display 1320 configured where this screen content can be animated with blinking marquee lights and Broadway show tones playing. The animated screen can fade to the text ad content for example "the big apple presents Broadway tickets on sale buy now while great seats available NYC tickets-r-us tap here to reserve your night on the town" 1330. The user can swipe to go directly to the prize boxes or tap as instructed to continue further with the ad. A user tap takes the user to the seating chart 1340 where the user selects the desired # of seats (2) from a drop-down list, selects the desired row (H) from a drop-down list, and selects the proximity to the stage (orchestra) from a drop-down list. The tickets price is displayed and the user can elect to pay from the user's online lottery scratcher wallet by tapping as instructed 1350. After payment or cancellation this ad closes and the prize box area is displayed of one embodiment.

In one embodiment a user shakes device to scratch-off prize coverings at same time 1360. Companies act as advertisers and sponsors of prizes 120 for example in a user selected game #2 downloaded to the user device 1375. A sponsoring company can place an ad in the prize box header area 1370 for example "Spring Sale—40" Wide Screen Only $850 This Weekend—XYZ Electronics—Main St.". This ad can be for a local company determined by the user GPS location of one embodiment.

The uncovered prize boxes reveal prizes that include a car, cash, salon services, hotel vacation rooms, and travel 1380. An online lottery scratcher user taps matching prizes, then taps a ticket serial number to claim prize 1390. The claimed prize information is automatically transmitted to the online lottery scratcher system where the order is processed to send via email, postal service or package carrier any physical prizes. Intangible prizes including free games and cash can be credited directly to the user wallet. In other instances show tickets, tickets to a sporting event and other of this type can be will-called and the verification information transmitted as a text message to the user device wherein the user can display the message to for example pick-up will-call tickets. Prizes including cars for example too large to ship can be claimed using the verification transmitted to the user's device and presented for example to the car dealership sponsoring the prize. The online lottery scratcher system expands the reach of this widely accepted consumer entertainment to enter the retailing and services market and provide player/users an opportunity to win a greatly expanded range of prizes without fear of developing a potential financial collapse from a gambling habit of one embodiment.

The foregoing has described the principles, embodiments and modes of operation of the embodiments. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the embodiments as defined by the following claims.

What is claimed is:

1. An online lottery scratcher system, comprising:

using at least one device configured for displaying a virtual digital game ticket wherein multiple prizes are concealed under a covering mask that can be virtually scratched-off to reveal the prize concealed underneath, and wherein a player/user using at least one device configured for scratching-off a covering mask including a virtual scratch disk, a touch screen finger swipe, eye position motion detection and shaking a player/user device to scratch-off a prize covering mask;

creating revenues other than virtual digital game ticket sales by incorporating advertising and marketing with the display of the virtual digital game ticket from companies for marketing their products and service in exchange for prize products and services and reducing advertising rates, and wherein companies can be sponsoring prizes and sponsoring a particular lotto or game, and wherein adding of companies prize products and services will increase a number of prizes available to be won by player/users thus increasing the odds of winning, and wherein advertising rates paid by the companies will create revenues other than virtual digital game ticket sales for a lottery agency and companies prizes will reduce a cost of prizes paid out by a lottery agency;

processing a virtual digital game ticket purchase wherein a player/user is buying a block of virtual digital game tickets and distributing the virtual digital game tickets to multiple friends or family members and wherein a groups of people buy at least one virtual digital game ticket, wherein each group participate buying at least one virtual digital game ticket responds to at least one function to register their identities, either via names, or email addresses or social network identities therefore assuring their inclusion in a purchase of the at least one virtual digital game ticket and of any winning prize;

using a player/user registration device for registering a player/user with an online lottery scratcher system wherein the registered player/user is inputting all of their pertinent information and qualifying for earning points or credits, and wherein a player/user can spend points or credits to play a virtual digital game ticket for free;

using a device configured for operating accurate tracking and restricting functions for limiting dollars or amounts a player/user can play on any given day, week, month and wherein accurate tracking and restricting functions uses registered player/user pertinent information including state or federal government issued identification; driver's license, and passport information to Indemnify an age of a player/user to be over the legal age to play and/or gamble and for compliance where federal law mandates an only "intra-state" user experience;

using an apparatus configured for operating at least one player/user recognition authentication feature configured to include a touch screen finger print detection device, a camera eye scan identifier device, a scratcher agency issued user identification code device configured to include a barcode, QR code, other code symbols, a printed card device, and a microphone voice recognition password device and configured to be used by the player/user for recognition and authentification of the player/user by an online lottery scratcher system for play, scratching functions, claiming prizes, spending points or credits to buy a virtual digital game ticket for free; and operating an apparatus configured for distributing at least one winning virtual digital game ticket player/user claimed prize, and wherein sending physical prizes includes using postal service and a package carrier, prizes including cars too large to ship can be claimed using a verification transmitted to a winning virtual digital game ticket player/user device and presented to a car dealership sponsoring the prize, and wherein intangible prizes including free games and cash can be credited directly to a player/user wallet, and wherein other prizes including show tickets, tickets to a sporting event and other prizes of this nature can be will-called wherein verification information can be transmitted as a text message to a player/user device wherein the player/user can display the verification information text message to pick-up will-call tickets.

2. The online lottery scratcher system of claim 1, wherein using at least one device configured for displaying a virtual digital game ticket includes digital computer systems, databases, digital memory devices and user interface devices including a camera, microphone, printer, scanner, cell phones, smart phones, tablets, and laptop and desktop computers.

3. The online lottery scratcher system of claim 1, wherein using at least one device configured for displaying a virtual digital game ticket includes at least one player/user interface device on which at least one digital programmable application has been installed.

4. The online lottery scratcher system of claim 1, wherein using a touch screen finger print detection device includes a player/user entering their finger print including any player/user hand and finger, player/user name and ID on the touch screen finger print detection device wherein the touch screen finger print detection device records, analyses and stores the finger print image including pressure/temperature, player/user name and ID and compares the recorded player/user finger print image with subsequent player/user entered finger print for authenticating and recognizing an authorized player/user.

5. The online lottery scratcher system of claim 1, wherein using a camera eye scan identifier device includes capturing, recording, analyzing and storing a player/user eye camera image and wherein using details of the player/user eye camera image to compare subsequent player/user eye images for authenticating and recognizing an authorized player/user.

6. The online lottery scratcher system of claim 1, wherein scratching-off a covering mask using eye position motion detection includes a player/user having their eyes facing at least one device configured to include a camera and wherein the player/user eye image is authenticated with the eye scan identifier verification and wherein the player/user eye movements are used to scratch-off a prize covering mask.

7. The online lottery scratcher system of claim 1, wherein operating a printed card device includes a player/user downloading a scratcher agency issued user identification code downloadable printed card, printing the card and wherein the player/user scans the printed card using a camera into the at least one player/user recognition authentication feature apparatus for recognition and authentication to use the player/user account.

8. The online lottery scratcher system of claim 1, wherein displaying a virtual digital game ticket and incorporating advertising includes animation, lighting effects, sound effects, and music.

9. The online lottery scratcher system of claim 1, wherein operating an apparatus configured for distributing at least one winning virtual digital game ticket player/user claimed prize includes distributing prizes including cash and non-cash prizes include advertiser products and services, online lottery scratcher free games.

10. The online lottery scratcher system of claim 1, wherein earning points or credits includes wherein a player/user can earn points or credits by a log-in observation of sponsored ads and commercials, participation in on-line lottery scratcher sponsoring company's product surveys, inputting online proof of purchase data, and by typing in purchased products serial # info of lottery scratcher sponsoring companies and wherein a player/user can spend points or credits to play the lottery for free.

11. The online lottery scratcher system of claim 1, wherein using a microphone voice recognition password device is configured to include a player/user speaking a password into a device microphone, recording a player/user voice characteristics, analyzing and storing the player/user voice characteristics and comparing the player/user voice characteristics to a subsequent spoken password for recognition and authentication to use the player/user account.

12. An apparatus, comprising:

an apparatus configured for displaying an online lottery scratcher system virtual digital game ticket wherein multiple prizes are concealed under a covering mask that can be virtually scratched-off to reveal the prize concealed underneath;

at least one device configured for scratching-off at least one covering mask including a virtual scratch disk, a touch screen finger swipe device, an eye position motion detection device and a device for shaking a device to scratch-off a prize covering mask;

an apparatus configured for incorporating advertising and marketing with the display of the virtual digital game ticket from companies to market their products and service in exchange for prize products and services and reduced advertising rates, and wherein the addition of prize products and services will increase a number of prizes available to be won by players thus increasing the odds of winning, and wherein the reduced advertising rates will create revenues other than virtual digital game ticket sales, and wherein companies can sponsor prizes and sponsor a particular lotto or game;

an apparatus configured for a player/user to buy a block of virtual digital game tickets and distribute the virtual digital game tickets multiple friends or family members and configured for groups of people to buy at least one virtual digital game ticket, wherein each group participate buying at least one virtual digital game ticket responds to at least one function to register their identities, either via names, or email addresses or social network identities therefore assuring their inclusion in purchase of the tickets and of any winning prize;

an apparatus configured for creating a player/user registration for registering a player/user with an online lottery scratcher system wherein the registered player/user inputs all of their pertinent information and qualifies to earn points or credits, and wherein a player/user can spend points or credits to play a virtual digital game ticket for free;

an apparatus configured for creating accurate tracking and restricting functions for limiting dollars or amounts a player/user can play on any given day, week, month and wherein accurate tracking and restricting functions uses registered player/user pertinent information including state or federal government issued identification; driver's license, and passport information to Indemnify an age of a player/user to be over the legal age to play and/or gamble and for compliance where federal law mandates an only "intra-state" user experience;

an apparatus configured for creating at least one player/user recognition authentication feature configured to include a touch screen finger print detection device, a camera eye scan identifier device, a scratcher agency issued user identification code device configured to include a barcode, QR code, other code symbols, a printed card device, and a microphone voice recognition password device and configured to be used by the player/user for recognition and authentification of the player/user by an online lottery scratcher system for play, scratching functions, claiming prizes, spending points or credits to buy a virtual digital game ticket for free and using a player/user wallet; and an apparatus configured for distributing at least one winning virtual digital game ticket player/user claimed prize, and wherein sending physical prizes includes using postal service and a package carrier, prizes including cars too large to ship can be claimed using a verification transmitted to a winning virtual digital game ticket player/user device and presented to a car dealership sponsoring the prize, and wherein intangible prizes including free games and cash can be credited directly to a player/user wallet, and wherein other prizes including show tickets, tickets to a sporting event and other prizes of this nature can be will-called wherein verification information can be transmitted as a text message to a player/user device wherein the player/user can display the verification information taxt message to pick-up will-call tickets.

13. The apparatus of claim 12, wherein an apparatus configured for displaying a virtual digital game ticket includes downloading and displaying a virtual digital game ticket on a player/user device with an online lottery scratcher system application installed.

14. The apparatus of claim 12, wherein a printed card device is configured to include a feature for a player/user downloading a scratcher agency issued user identification code downloadable printed card, and for printing the card and wherein the player/user scans the printed card using a camera into the at least one player/user recognition authentication feature apparatus for recognition and authentication to use the player/user account.

15. The apparatus of claim 12, wherein the apparatus is configured to include digital computer systems, databases, digital memory devices and user interface devices including a camera, microphone, printer, scanner, cell phones, smart phones, tablets, and laptop and desktop computers.

16. The apparatus of claim 12, wherein a touch screen finger print detection device includes a player/user entering their finger print including any player/user hand and finger, player/user name and ID on the touch screen finger print detection device wherein the touch screen finger print detection device records, analyses and stores the finger print image including pressure/temperature, player/user name and ID and compares the recorded player/user finger print image with subsequent player/user entered finger print for authenticating and recognizing an authorized player/user.

17. The apparatus of claim 12, wherein a camera eye scan identifier device includes capturing, recording, analyzing and storing a player/user eye camera image and wherein using details of the player/user eye camera image to compare subsequent player/user eye images for authenticating and recognizing an authorized player/user.

18. The apparatus of claim 12, wherein an eye position motion detection device is configured for scratching-off a covering mask wherein a player/user having their eyes facing at least one device configured to include a camera and wherein the player/user eye image is authenticated with the eye scan identifier verification and wherein the player/user eye movements are used to scratch-off a prize covering mask.

19. The apparatus of claim 12, wherein an apparatus configured for displaying an online lottery scratcher system virtual digital game ticket is configured for incorporating and displaying advertising including animation, lighting effects, sound effects, and music.

20. The apparatus of claim 12, wherein the apparatus configured for creating a player/user registration is configured for a player/user earning points or credits includes wherein a player/user can earn points or credits by a log-in observation of sponsored ads and commercials, participation in on-line lottery scratcher sponsoring company's product surveys, inputting online proof of purchase data, and by typing in purchased products serial # info of lottery scratcher sponsoring companies and wherein a player/user can spend points or credits to play the lottery for free.

* * * * *